United States Patent [19]

Wolosianski

[11] 4,278,374
[45] Jul. 14, 1981

[54] APPARATUS FOR SCREW-THREADING

[76] Inventor: Alexandre Wolosianski, 5815 Plantagenet, Montreal, Quebec, Canada

[21] Appl. No.: 36,699

[22] Filed: May 7, 1979

[30] Foreign Application Priority Data

May 16, 1978 [GB] United Kingdom ............... 19911/78

[51] Int. Cl.³ .............................................. B23C 3/28
[52] U.S. Cl. .................................... 409/74; 10/101 R; 409/77
[58] Field of Search .................... 409/74, 77; 90/11.58, 90/11.64; 407/86; 10/91, 101

[56] References Cited

U.S. PATENT DOCUMENTS

| 2,691,921 | 10/1954 | Burgsmuller | 409/74 |
| 2,749,807 | 6/1956 | Burgsmuller | 409/74 |
| 2,749,808 | 6/1956 | Burgsmuller | 409/74 |
| 2,877,536 | 3/1959 | Tronosmith | 407/86 |

Primary Examiner—W. D. Bray
Attorney, Agent, or Firm—Cushman, Darby & Cushman

[57] ABSTRACT

In combination with a lathe holding and slowly revolving, about its longitudinal axis, a work-piece to be screw-threaded with a tapering portion and a cylindrical portion, a tool holder ring is eccentrically mounted about the work-piece and is rapidly rotated about the work-piece in the same direction as the work-piece but at a relatively higher speed; while rotating, the tool holder ring is caused to advance longitudinally along the revolving work-piece; a plurality of cutting elements, radially secured in the holder, have cutting edges that intermittently and successively contact tangentially the work-piece during each revolution so as to move from the work-piece a chip with each revolution; the cutting elements are disposed in a series of planes and the number of planes is equal to the length of the tapering section divided by a pitch of the thread plus one, the depth of the thread being accomplished by the continuous chipping of subsequent cutting elements set on adjacent planes of the tool holder ring.

8 Claims, 7 Drawing Figures

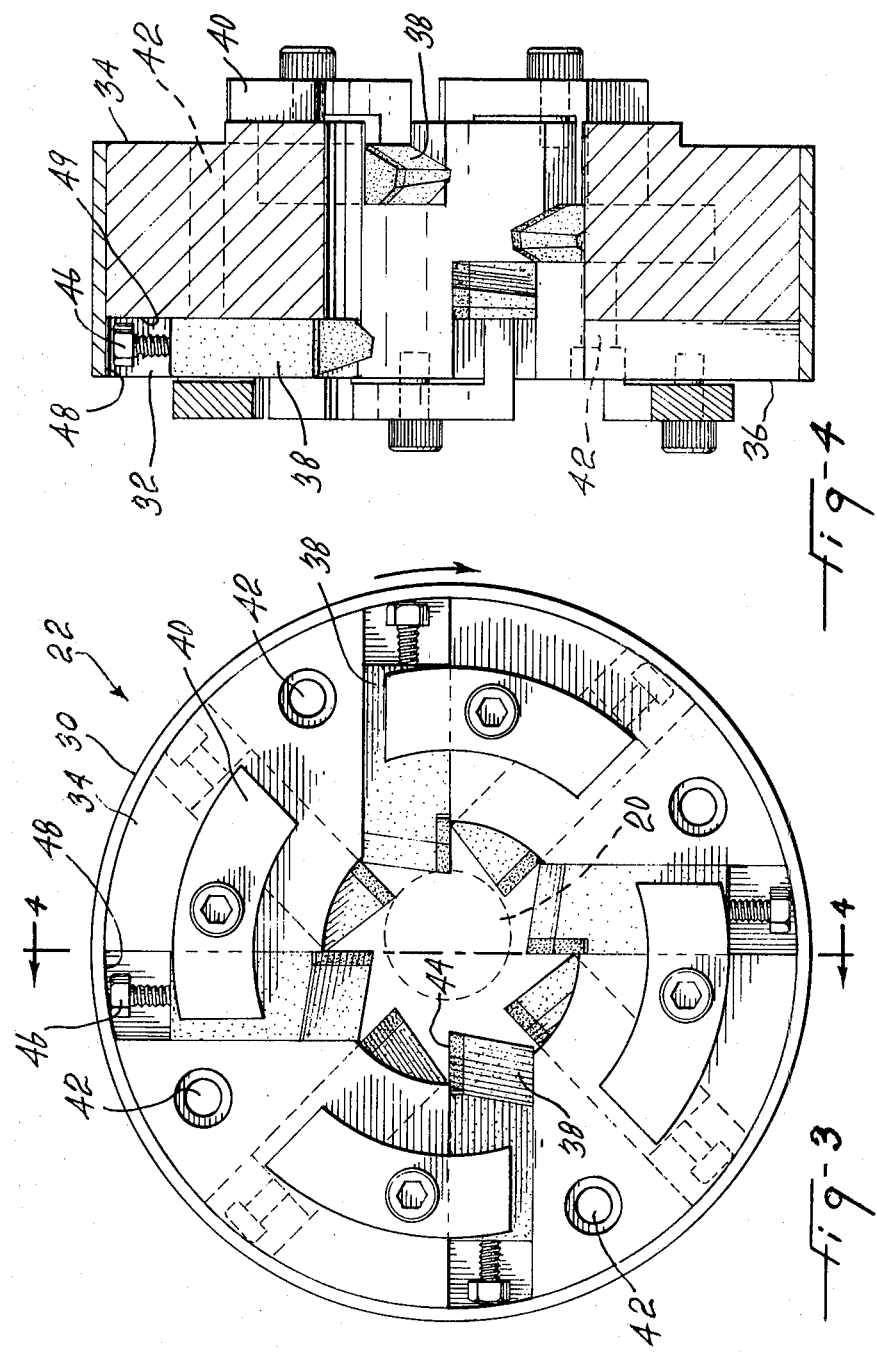

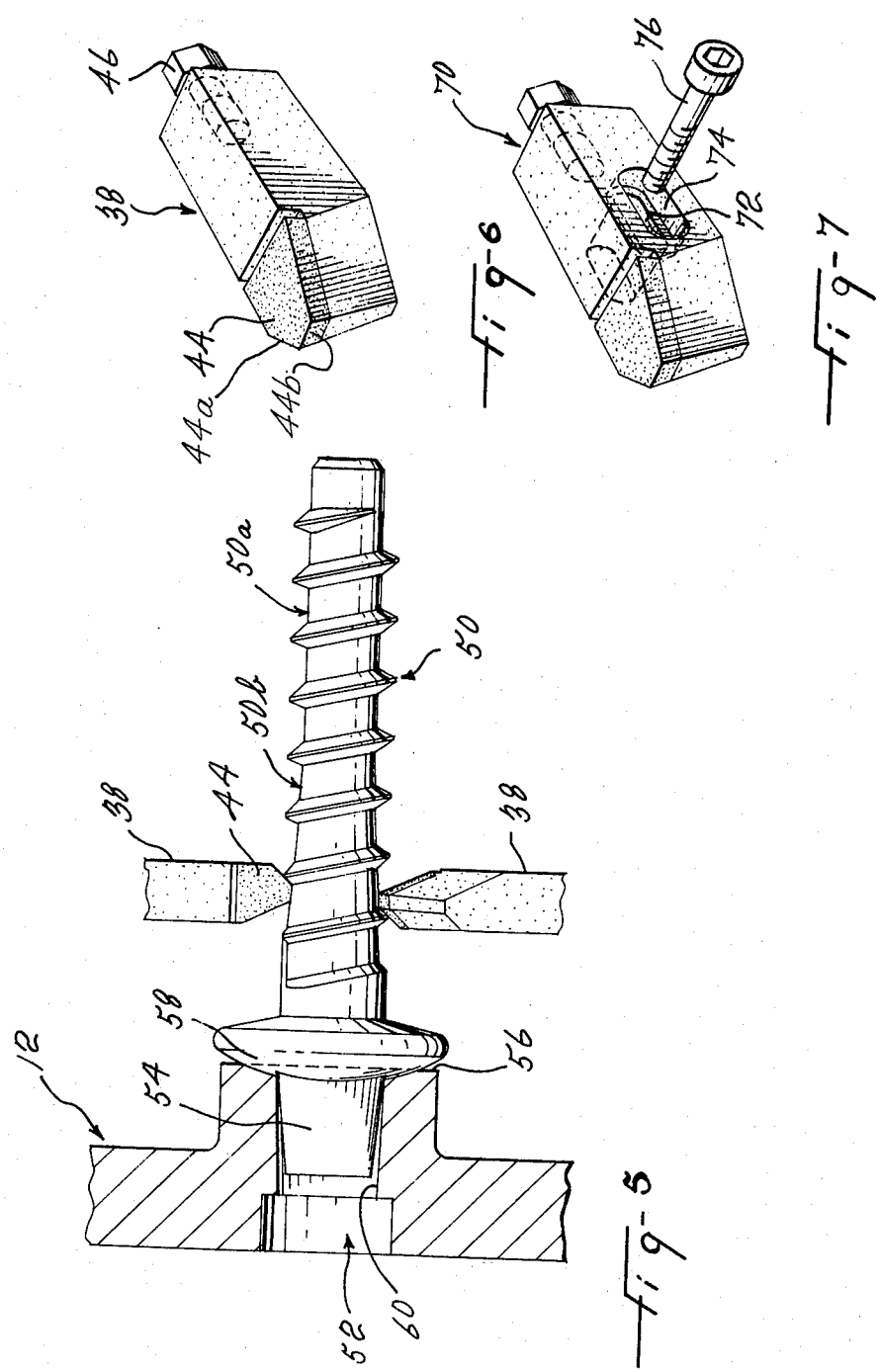

APPARATUS FOR SCREW-THREADING

FIELD OF THE INVENTION

The present invention pertains to improvements relating to the manufacture of threads and, more particularly, to a tool holder ring to be mounted on a lathe for screw-threading a work-piece.

BACKGROUND OF THE INVENTION

Screws known in the trade as "Tirefond or North American spike screws" are used principally to fasten a steel rail to a cross-tie made of either soft or hard wood. Such screws replace the common spike which has, for a long time, been used for fastening rails to their beds. One widely known method of making these screws is by a hot forging and hot rolling process. Such method is not only costly in terms of energy consumption and in space requirement but is not reliable in terms of accuracy and precision.

In forming screw threads by the thread milling process, there are two main methods which are both limited in their applicaton. One method consists in using a single cutter while the other involves the use of a multiple cutter. In each case, the cutter must revolve as fast as possible without, however, dulling the cutting edges excessively as the part on which the thread is milled is revolved at a very slow rate. In most cases, the cutter is set at the full depth of the thread groove and a single thread is accomplished in a single pass. In the case of a deep thread of coarse pitch, such as that of screws associated with the present invention, the use of several cuts is required, and it is practically impossible to maintain an identical thread crest width throughout the entire length of the screw forming operation, especially when a conical or taper threaded section on the screw is required.

OBJECTS AND STATEMENTS OF THE INVENTION

It is an object of the present invention to reduce the various steps involved in carrying out the above described conventional manufacturing methods on a screw having a taper portion and a cylindrical portion to a quick automatic operation which is not relatively inexpensive in terms of energy and space requirement but which offers also a high degree of precision and accuracy and maintains labour utilization to a relatively low cost. Furthermore, the present method requires relatively short production time and the use of semi-skilled labour. It also eliminates the high cost of energy consumption innate to the hot forging and hot rolling process.

The present invention therefore provides on a standard lathe having attachment means for holding and slowly revolving, about its longitudinal axis, a work-piece to be screw-threaded with a tapering portion and a cylindrical portion, a tool holder ring eccentrically mounted about the work-piece; drive means are provided for rapidly rotating the tool holder ring around the work-piece allowing it to rotate in the same direction as the work-piece but at a relatively higher speed; means are also provided for advancing the tool holder ring longitudinally along the revolving work-piece. A plurality of cutting elements are radially secured in the holder ring and are disposed in a series of planes, the number of planes is equal to the length of the tapering portion divided by the pitch of the thread plus one; the cutting elements having cutting edges and the distance between the cutting edges and the longitudinal axis of the work-piece decreases from the first cutting element adjacent the head of the work-piece; the cutting edges intermittently and successively contacting tangentially the work-piece during each revolution so as to remove from the work-piece a chip with each revolution of a cutting element; the depth of the thread is accomplished by the continuous chipping action of subsequent cutting elements set on adjacent planes of the tool holder ring.

The scope of applicability of the present invention will become apparent from the detailed description given hereinafter; it should be understood, however, that this description, while indicating preferred embodiments of the invention, is given by way of illustration only since various changes and modifications within the spirit and scope of the invention will become apparent to those skilled in the art

BRIEF DESCRIPTION OF THE DRAWINGS

FIG. 3 is a side view of the tool holder ring;

FIG. 4 is a cross-sectional view taken along lines IV—IV of FIG. 3;

FIG. 5 shows a threaded screw made with the tool holder ring of the present invention showing two juxtaposed cutting elements of a plane;

FIG. 6 is a perspective view of a cutting element used with the present invention; and FIG. 7 is a perspective view of another form of a cutting element.

DESCRIPTION OF PREFERRED EMBODIMENT

Figure 1:
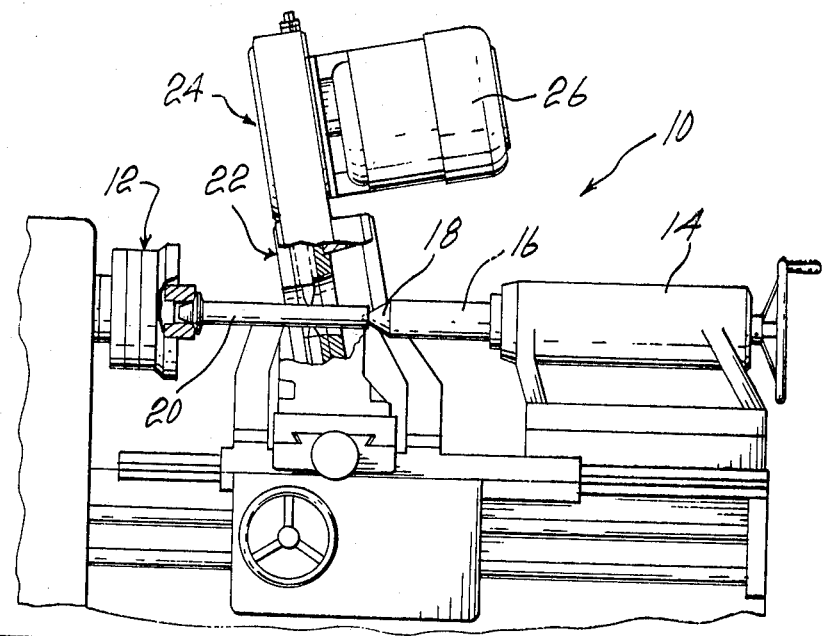
FIG. 1 is an elevational view showing a tool holder ring mounted on a standard lathe in accordance with the present invention.

Referring to FIG. 1, there is shown a conventional lathe 10 which is equipped with a clamping chuck 12, the particular construction will be described hereinbelow, and a tail stock 14 with its tail pin 16 having its pointed end 18 engaged in a cone-shape recess in the extremity of a non-threaded shank or work-piece 20. Mounted eccentrically around work-piece 20 is a tool holder ring 22 which is mounted in a bearing member generally denoted as 24. A series of openings 42 extend from side face 34 to side face 36 of circular body 22 and serve to receive securing means (not shown) for mounting the ring to an inner bearing portion of member 24. Inside bearing member 24, the tool holder ring 22 is adapted to be rotatively driven by a motor 26. The conventional lathe 10 has standard drive means for rotating slowly work-piece 20 and for advancing the entire assembly of tool holder ring 22, bearing member 24 and motor 26 longitudinally along the work-piece. The rotation of the tool holder ring is made to be much higher than the rotation of the shaft 20 (about 50 times ).

Figure 2:
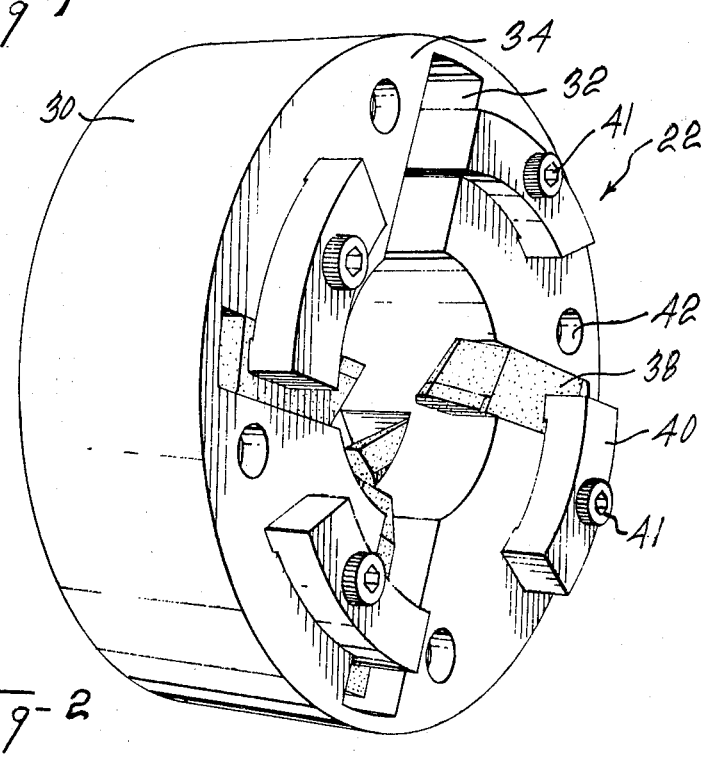
FIG. 2 is a perspective view of the tool holder ring.

Referring to FIGS. 2,3 and 4, the tool holder ring comprises a circular body 30 into which are provided a series of radial cavities 32 opening on respective opposite side faces 34 and 36 of the body. In the embodiment illustrated, four cavities are shown on each face of the tool holder ring; but, as explained hereinbelow, there may be provided more cavities if desired. In each cavity is secured a cutting element 38. These cutting elements are disposed in a series of adjacent planes and held in the cavities by means of bracket members 40 which are tightly retained against the cutting elements by securement bolts 41 threadedly engaged to the ring on opposite side faces 34 and 36. The planes are arranged in pairs and diametrically juxtaposed to one another. The depth of each juxtaposed pair of cavities from its respective side face is such as to form a series of adjacent planes extending the width of circular body 22.

Each element 38 has a cutting edge 44 which may be a carbide tip and which is so positioned that, during each revolution of the tool holder ring, it contacts tangentially the work-piece so as to move from the work-piece a chip. Adjustments in the relative positioning of the cutting elements with respect to the work-piece are carried out by bolts 46, the heads of which bear against the inner wall 48 of the cavities.

Referring to FIG. 5, the work-piece has taken the shape of a screw 50 with a cylindrical portion 50a and a tapering or conical portion 50b. The number of planes required in the tool holder ring depends on the conicity of the tapering portion of the screw; in other words, the greater the taper requirements, the more planes used. If a complete cylindrical thread were required, the use of a single plane would be utilized. In the case of the taper portion, the number of planes is directly related to the number of threads within the taper; hence, the formula: the length of the cone divided by the pitch plus one, the additional one being the one required to form the cylindrical configuration. Each plane may be divided into more than one cutting cavities to provide a better finish; in the embodiment illustrated, there are two cutting elements per plane. Although the two cutting elements are diametrically opposite to one another, they serve, however, to cut out the complete configuration of the desired thread but only at its prescribed depth. The depth of the thread is accomplished by the continuous chipping action of the subsequent cutters which are set on the various planes of the tool holder. Hence, for each plane of the embodiment illustrated in the drawings, the pair of diametrically opposed cutting elements cut on the same thread groove at the identical depth of the previous cutters, but at twice the depth of the previous pair of cutters. The greater the depth of the thread desired, the more various planes required. It should be noted that, in FIG. 5, the two cutting edges of a plane are shown in contact with the screw; this is intentional to show the contact area of each cutting edge with the thread. However, it is to be understood that there are no two chipping actions done instantly and that, of the two cutting elements shown in that figure, one is at a distance from the screw; the other is chipping away at the screw.

The helical groove of the screw is formed by proper inclination of the power head with respect to the axis of the work-piece as illustrated in FIG. 1. The inclination is equal to the angle pitch. The groove is also formed in conjunction with the appropriate ratio between the revolving work-piece and the longitudinal movement of the power head along the work-piece. When forming a right-hand thread, the inclination in relation to the work-piece is in one direction while a left-hand thread requires the inclination in te opposite direction.

Referring to FIG. 5, the clamping chuck 12 is modified with respect to standard chucks; it includes a bore 52 to receive the frusto-conical head 54 portion of the screw 50. A projecting end face 56 of the chuck has a concave recessed portion to receive the rounded shoulder portion 58 of the head of the screw. Bore 52 has a restricted portion 60 somewhat greater than the frusto-conical portion 54 such that the screw 50 can be axially displaced in the chuck 12 to provide linear adjustment between the chuck and the tail-stock pin 18. Rear portion 62 of bore 52 is adapted to receive an ejection pin (not shown) to remove the threaded screw after the tool ring assembly has returned to its original position.

FIG. 6 shows the cutting element 38 to be used with the particular construction of the tool ring shown in FIGS. 2, 3 and 4; its carbide cutting edge 44 has two cutting sections 44a and 44b, the first section corresponding to the leading or backing profile of the thread, the other corresponding to the conical or tapering root of the thread. To form the cylindrical portion of the work-piece shown in FIG. 5, the last pair of diametrically juxtaposed cutting elements have their cutting edge sections 44b slanted in opposite direction to that of the preceding pair of cutting elements (see FIGS. 2–5 ).

FIG. 7 shows a modified cutting element 70 which is so structured as to avoid the need of bracket members 40 against the side walls 34 and 36. This cutting element is similar in construction to cutting element 38 except for an elongated opening 72 extending transversally through the body thereof. This opening has a recessed shoulder portion 74 to receive the head of a bolt 76 which extends through the cutting element 70 and threadedly engages side wall 49 (see FIG. 4 ) of the cavity in which it is received. In this form of the invention, the elimination of bracket members 40 allows the superposition and attachment of one or more additional tool rings 30 thereby permitting additional planes of cutting elements. The shape of opening 72 allows the radial displacement of the cutting element in its cavity for adjustement of the cutting edge relative to the work-piece.

Although the invention has been described above with respect to one specific form, it will be evident to the man skilled in the art that it can be modified and refined in various ways. For example, although not shown, automatic control means may be provided for limiting the longitudinal travel and threading operation of the tool ring assembly about the work-piece, for adjusting the eccentricity of the tool ring relative to the longitudinal axis of the work-piece and for returning the assembly to its original starting position. Furthermore, a protective cover may be provided for directing downwards into a recipient chips removed during the threading operation. It is therefore wished to have it understood that the present invention is not to be limited in interpretation except by the terms of the following claims.

The embodiments of the invention in which an exclusive property or privilege is claimed are defined as follows:

1. In combination with a lathe having attachment means for holding and slowly revolving, about its longitudinal axis, a work-piece to be screw-threaded with a tapering portion and a cylindrical portion, an apparatus for screw-threading said work-piece comprising:

a tool holder ring eccentrically mounted around said work-piece;

drive means for rapidly rotating said ring around said work-piece, said tool holder ring rotating in the same direction as said work-piece but at a relatively higher speed;

a plurality of cutting elements radially secured in said tool holder ring, said cutting elements being disposed in a series of adjacent planes, the number of planes being equal to the length of said tapering portion divided by the pitch of said thread plus one, and said cutting elements having cutting edges and the distance of said cutting edges to the longitudinal axis of said work-piece decreasing from a first cutting element adjacent the head of said work-piece; and means for advancing said tool holder ring longitudinally of said revolving work-piece so that said cutting edges intermittently and successively tangentially contact said work-piece during each revolution of a cutting element, and so that the depth of the thread is accomplished by the continuous chipping of subsequent cutting elements set on said adjacent planes of said tool holder ring as said tool holder ring advances along said work-piece toward the head of said work-piece.

2. An apparatus as defined in claim 1, wherein said cutting elements are arranged in pairs in each plane, the cutting elements of a plane being diametrically juxtaposed in said plane.

3. An apparatus as defined in claim 1, said body including radial cavities receiving therein said cutting elements; removable securement means mounted on said body for securing said cutting elements in said cavities.

4. An apparatus as defined in claim 3, wherein each said cutting element includes adjustment means extending in said cavity for varying the distance between the cutting edge of said cutting element to said work-piece.

5. An apparatus as defined in claim 1, wherein said tool holder ring is inclined relative to the longitudinal axis of said work-piece to thereby define the angle pitch.

6. An apparatus as defined in claim 1, wherein said cutting element has an opening extending transversally thereof for receiving therethrough means for securing said cutting element in said cavity.

7. An apparatus as defined in claim 6, wherein said opening is elongated in the longitudinal direction of said cutting element to enable adjustment of said cutting element in said cavity.

8. An apparatus as recited in claim 1 wherein the cutting edge of each cutting element consists of two cutting sections, one of said sections corresponding to the leading or backing profile of the thread, and the other of said sections corresponding to the tapering or conical section of the root of the thread.

* * * * *